(12) United States Patent
Guillen

(10) Patent No.: US 9,800,701 B1
(45) Date of Patent: Oct. 24, 2017

(54) MOBILE DEVICE CASE WITH INTEGRATED ADAPTOR

(71) Applicant: Newton Guillen, Plymouth, MN (US)

(72) Inventor: Newton Guillen, Plymouth, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

(21) Appl. No.: 15/203,089

(22) Filed: Jul. 6, 2016

(51) Int. Cl.
*H04B 1/38* (2015.01)
*H04M 1/02* (2006.01)
*H04B 1/3888* (2015.01)
*H04M 1/725* (2006.01)
*H04M 1/00* (2006.01)

(52) U.S. Cl.
CPC ........ *H04M 1/0274* (2013.01); *H04B 1/3888* (2013.01); *H04M 1/0254* (2013.01); *H04M 1/72527* (2013.01)

(58) Field of Classification Search
CPC .............. H04B 1/3888; H04M 1/0254; H04M 1/72527

USPC ................................................ 455/557, 575.8
See application file for complete search history.

(56) References Cited

U.S. PATENT DOCUMENTS

2012/0328144 A1* 12/2012 Dugger ................ H04R 1/1033
381/384
2015/0037618 A1* 2/2015 Kim ..................... H01M 2/1022
429/7

* cited by examiner

*Primary Examiner* — Lee Nguyen
(74) *Attorney, Agent, or Firm* — Tysver Beck Evans (57) ABSTRACT

The present application is directed to a case and analog port adaptor for use with a phone. The case includes a body configured to be engaged around the perimeter of a phone. The case includes an electronic package that has an analog port for receipt of a TRS plug of an electronic accessory such as headphones. The electronics package also includes an electronic plug and an electronic pathway. The electronic plug interfaces with an electronic port of the phone. The electronic pathway provides the mechanism for power and data communication between the phone and the analog port via the interface of the case's electronic plug to the electronic port of the phone.

15 Claims, 9 Drawing Sheets

MOBILE DEVICE CASE WITH INTEGRATED ADAPTOR

FIELD OF THE INVENTION

The present disclosure is directed to a dual function case and adaptor for use with a cellular phone (smart phone), portable media player, computer or other mobile electronic device, hereinafter referred to collectively with the term "phone". The present phone case and adaptor includes one or more auxiliary electronic ports for use with common phone accessories such as audio headphones. The case is configured to engage the universal serial bus port (USB Type-C, etc.) or lightning port common on most phones and interface the case with the electronics of the phone therethrough, so as to provide the phone with functional access to the auxiliary port or ports of the case.

More specifically, the case is configured to provide a phone that may be lacking a 3.5 mm analog port with at least one such port via electronic engagement of the case to the USB or lightning port of the phone.

BACKGROUND

Figures 1A, 1B:
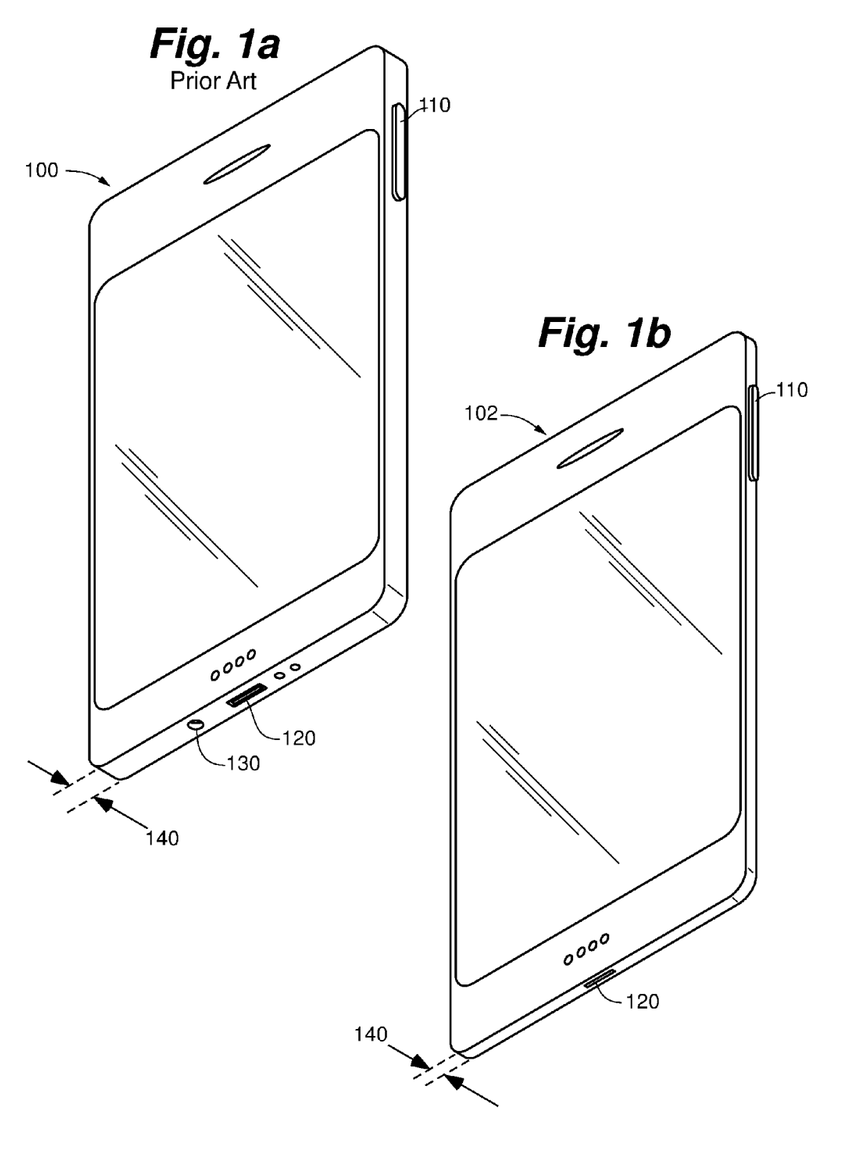
FIG. 1*a* is a front perspective view of a PRIOR ART phone.
FIG. 1*b* is a front perspective view of an ultra-thin phone.
Figure 2:
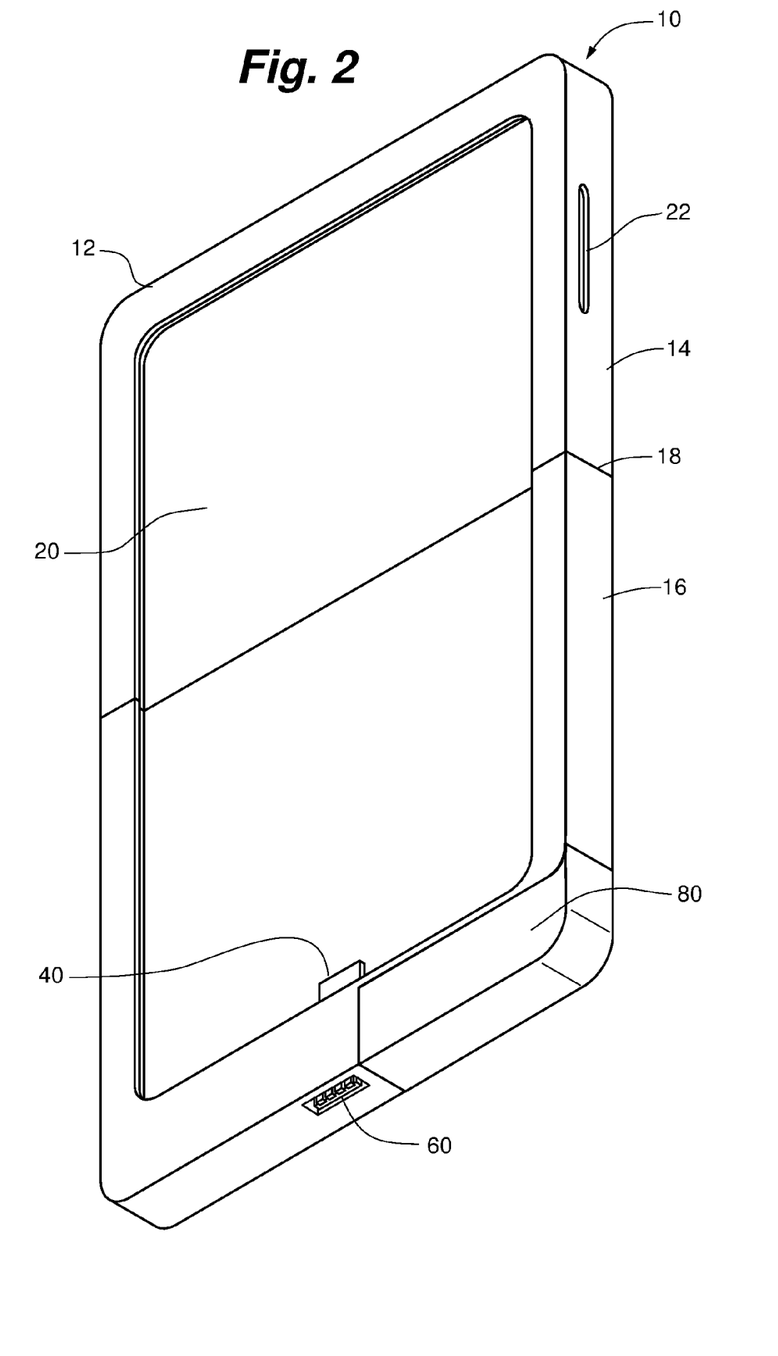
FIG. 2 is a front perspective view of an embodiment of a phone case and analog port adaptor for use with a phone such as is depicted in FIG. 1*b*.

Existing phones, an example of which 100 is illustrated in PRIOR ART FIG. 1*a*, have sufficient surface area and thickness to provide a variety of user controls 110 and ports 120 and 130 for use. In the example shown, phone 100 includes a USB or lightning port 120 whereby the phone may receive power (to charge the phone's battery), electronically communicate with other devices, etc. Such phones may also include auxiliary ports 130 such as a 3.5 mm analog port 120 through which accessories such as speakers or headphones (not shown) equipped with an appropriately sized TRS connector may be plugged directly into the phone.

As technology has advanced the thickness 140 of phones has been reduced and phone manufacturers and their customers alike continue to strive for even greater reductions in phone thickness. As this trend is expected to continue it is reasonable to conclude that future "ultra-thin" phones, an example of which 102 is shown in FIG. 1*b*, will at some point be so thin as to no longer have sufficient room to include auxiliary ports such as a 3.5 mm analog port 130 (shown in PRIOR ART FIG. 1*a*). With such phones, it will be necessary for users to replace their existing headphones (typically used with the 3.5 mm analog port) with new accessories that are capable of plugging into and accessing the phone exclusively through the USB or lightning port 120.

It is noted that headphones for use with the 3.5 mm analog port, common on nearly all existing phones, are available in a wide range of styles, qualities and costs. It is expected that many consumers will want to continue using their existing headphones, particularly those headphones of the highest quality and cost, even after ultra-thin phones, such as phone 102 shown in FIG. 1*b*, become ubiquitous. Thus, there will be a need to provide the users of such ultra-thin phones with some way to continue to use their existing headphones or other accessories that rely on a 3.5 mm analog port, even after that port is no longer available.

Thus, it is a goal of the present disclosure to provide a mechanism that will allow an ultra-thin phone (or even an existing style of phones), which lacks a 3.5 mm analog port, with an auxiliary 3.5 mm analog port that is in electronic communication with the phone via the USB or lightning port of the phone.

DETAILED DESCRIPTION

Turning to FIGS. 2-5, a first embodiment of the disclosure is shown in the form of a phone case 10. Case 10 is configured to provide a protective frame or body 12 around the perimeter of phone such as phone 102 shown in FIG. 4. In the embodiment shown, case 10 includes a two-piece frame having an upper portion 14 and a lower portion 16 with a linking mechanism 18 therebetween. This two-piece construction allows the case 10 to be separated so as to allow the phone 102 to be engaged within the receiving area 20 of the lower portion 16 of the body 12. Once the phone 102 is properly engaged to the lower portion 16, the upper portion 14 of the body 12 is connected to the lower portion 16 of the body 12 via the linking mechanism 18 shown in FIGS. 3 and 4.

Figure 3:
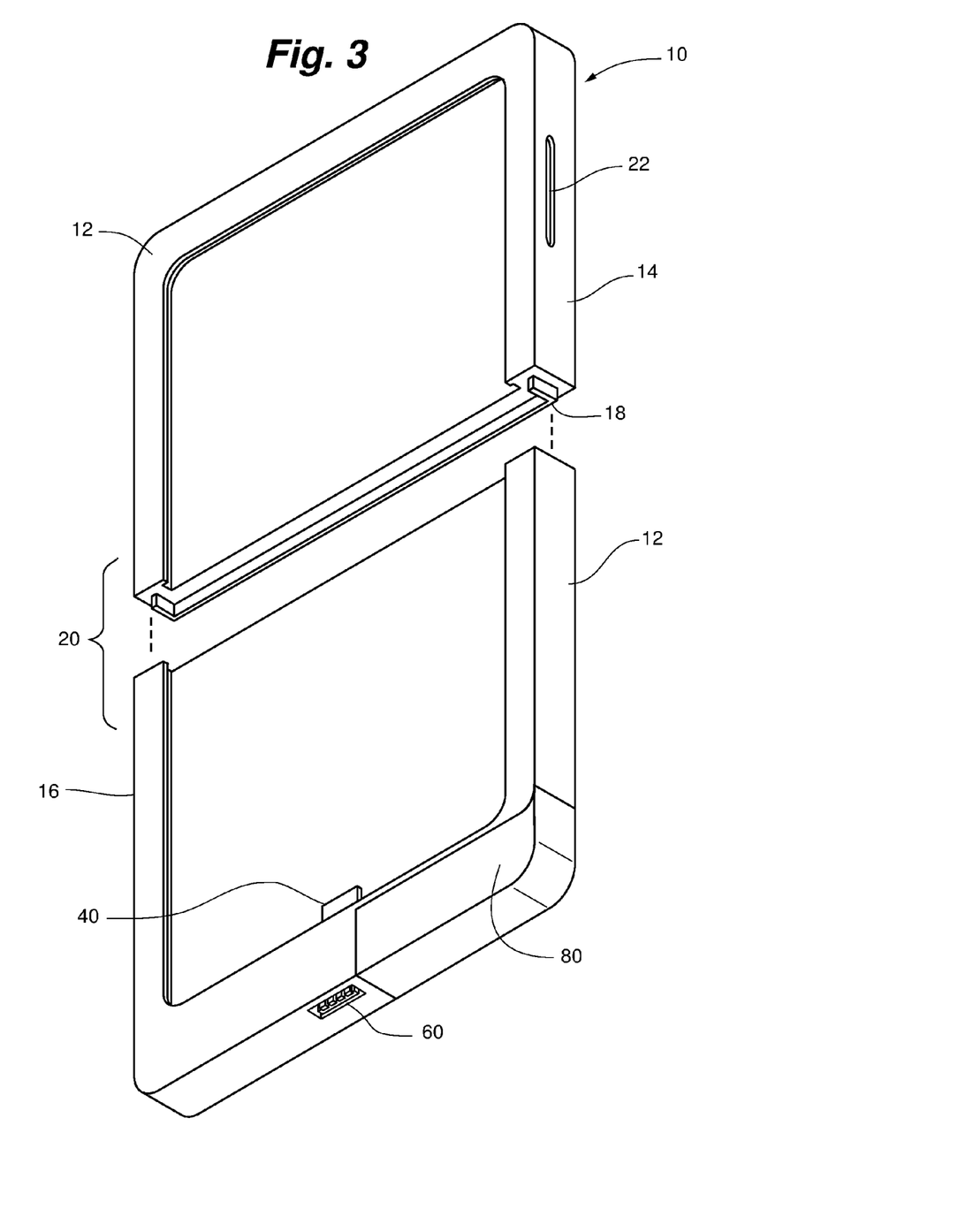
FIG. 3 is a front perspective, view of the embodiment shown in FIG. 2, wherein the body of the case is shown in separate upper and lower portions.
Figure 4:
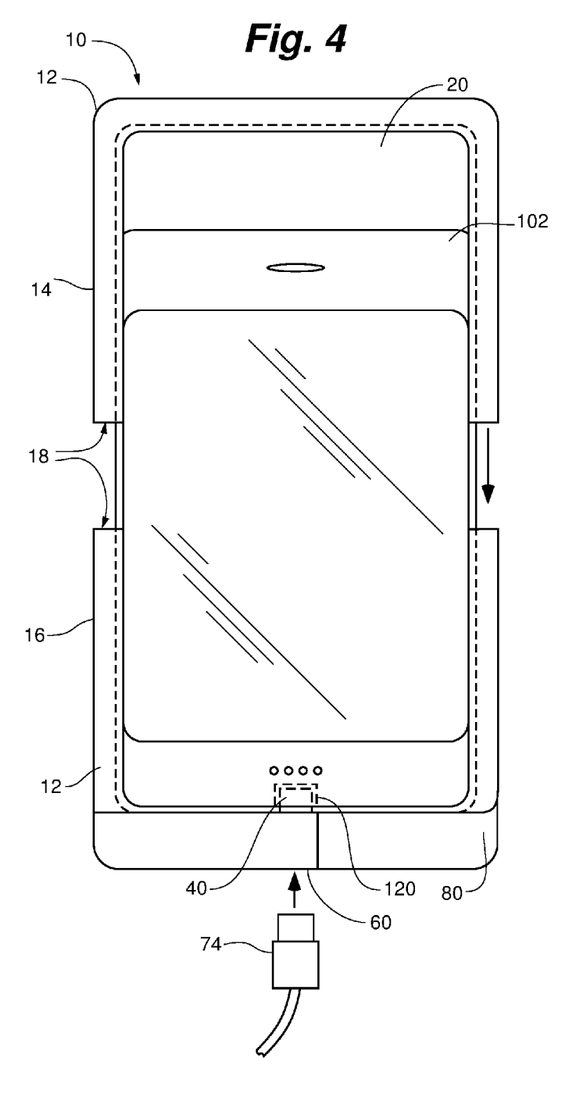
FIG. 4 is a front view of the embodiment shown in FIG. 3 with the phone in place and prior to engagement of the upper portion of the body to the lower portion of the body.

Linking mechanism 18 may be any form of linkage capable of releasably securing the upper portion 14 and lower portion 16 to one another. Examples of such mechanisms include but are not limited to frictional interfaces such as snap-fit connections, lock and key assemblies; magnetic connections, or other mechanisms.

As indicated, body 12 functions to provide a protective encasement of the phone 102 that is secured therein. As such the body 12 is constructed of durable material capable of resisting impacts, abrasions, and other events that would otherwise harm an unprotected phone. In at least one embodiment the case is constructed of one or more high strength resins, polymers, plastics.

In some embodiments the body 12 of the case 10 is made of a flexible material (e.g. synthetic or natural rubber, etc.)

cable of being stretched or temporarily deformed to allow the phone 102 to be inserted into the receiving area 20 of the case, even where the case defines a single piece that surrounds the perimeter of the phone.

The case 10 includes various openings or ancillary control features that are defined by or positioned on the body 12 to allow a user (not shown) to control the normal control mechanisms inherent to the phone. For example, in the embodiment shown in FIGS. 2-5 an opening 22 through which the on/off (wake/sleep, home, etc.) control 110 common to most phones is provided. Other openings or control mechanisms are provided for access to volume controls, etc. (not shown).

While one function of the case 10 is to provide protection to a phone 102 that is properly positioned within the body 12, an additional feature of the case is to provide a phone 102 with one or more ancillary connections 30 through which electronic accessories, such as audio speakers or headphones may interface with the case 10 and phone 102.

Figure 5:
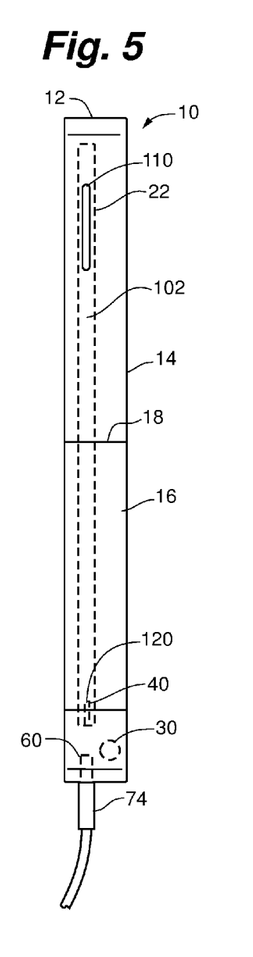
FIG. 5 is a side view of the embodiment shown in FIG. 4 following engagement of the upper portion of the body to the lower portion of the body around the perimeter of the phone.

As mentioned above, as technology advances it is expected that as phones will be reduced in profile or "thinness". By removing the 3.5 mm analog audio port from a phone, future phones can be made thinner than they would be with such an audio port present. By providing the case 10 with a 3.5 mm analog port 30 such as is shown in FIG. 5, the case 10 allows any phone 102 properly engaged to the case 10 to utilize such a port 30 even when the phone 102 lacks such a port itself (see FIG. 1b).

In order to allow the phone 102 to electronically communicate with the port 30, the case 10 includes an electronic male interface or plug 40 through which the case is mechanically and electronically connected to the phone 102 via the female electronic interface or port 120.

The plug 40 may take the form of any sort of commonly used computer bus and power connector plug suitable for use with a phone 102. For example, the plug 40 may comprise, in at least one embodiment, an 8 pin lightning plug (male) such as are commonly used with the APPLE® IPHONE®. In another embodiment, the interface 40 comprises a 5 pin Micro-USB plug (male) such as is commonly used with various brands of ANDROID® based phones. Other types of connections that plug 40 may be configured as include USB-A, USB-B, USB-C, USB Micro-A, USB Micro-B, USB Mini-A, USB Mini-B, USB 2.0-3.1, INTEL® THUNDERBOLT™, or any other universal serial bus connector and power supply adaptor In addition to the plug 40, the case 10 includes electronic components which provide a pathway 50, an example of which is depicted in FIG. 6, to allow power and data signals to be transmitted between the audio port 30 and the electronic port 120 of the phone 102.

In some embodiments the case 10 is also provided with a female electronic interface or port 60. The case port 60 communicates with the electronic port 120 of the phone 102 via the pathway 50 and plug 40, thereby allowing the phone 102 to be charged or electronically communicate with other devices (represented generally by cord 74) that are connected to the port 60 of the case 10, such as in the manner depicted in FIGS. 4-6.

Figure 6:
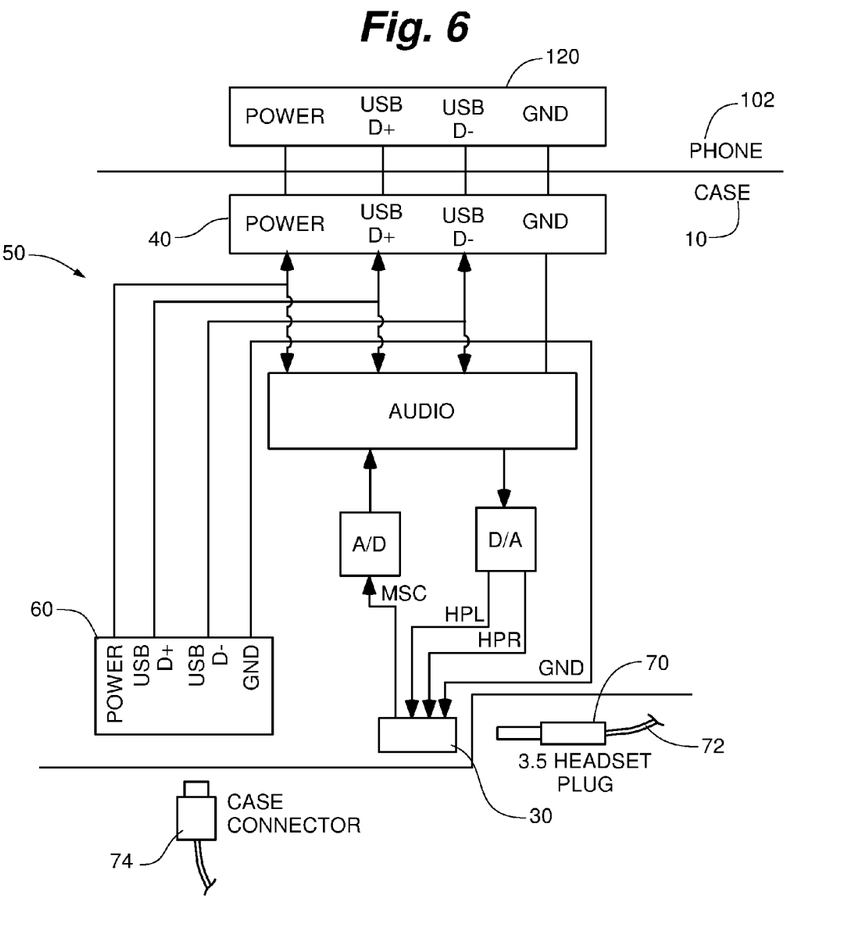
FIG. 6 is an illustration of the electronic pathway of various components of the phone and case shown in FIGS. 1*b*-5.
Figure 7:
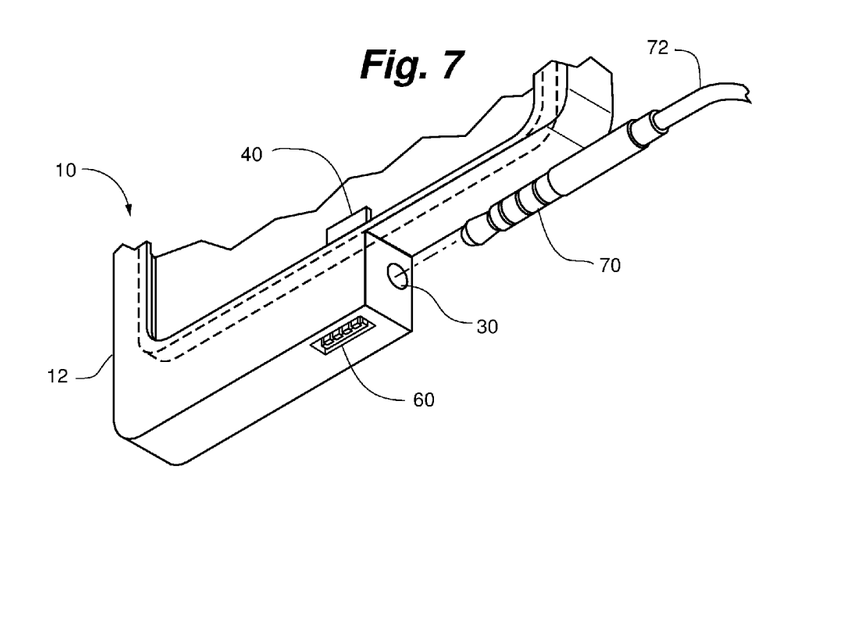
FIGS. 7 and 8 show a TSR plug of an accessory device and the manner in which such a plug engages the analog port of the case.
Figure 8:
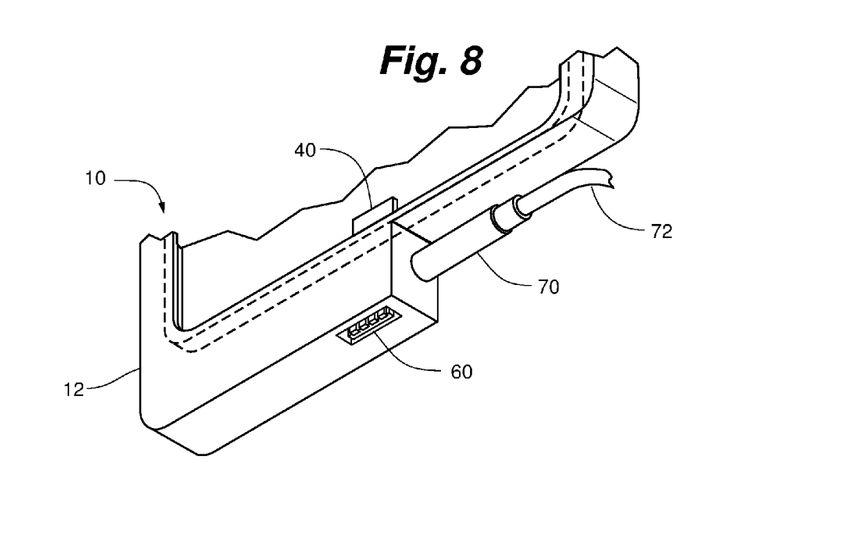

A 3.5 mm TRS connector jack or plug 70 such as is shown in FIGS. 6-8 can interface with the 3.5 mm analog port 30, and using pathway 50 (see FIG. 6) likewise communicate with the phone 102 via the interface of the plug 40 of the case 10 and port 120 of the phone 102. The electronics of the case 30 act to convert the digital signal transmitted from the phone 102 into an analog signal which is received by the headphones 72.

As illustrated in FIGS. 7 and 8, it will be appreciated that the position of the analog port 30 in close proximity to the electronic port 60 allows the electronics of the case to be very compact thereby minimizing the bulk of the case 10. Moreover, the medial position of the analog port 30 on the body 12 of the case 10, helps to minimize the protrusion of the TRS plug 70 beyond the dimensions of the case 10 when engaged thereto.

Figure 9:
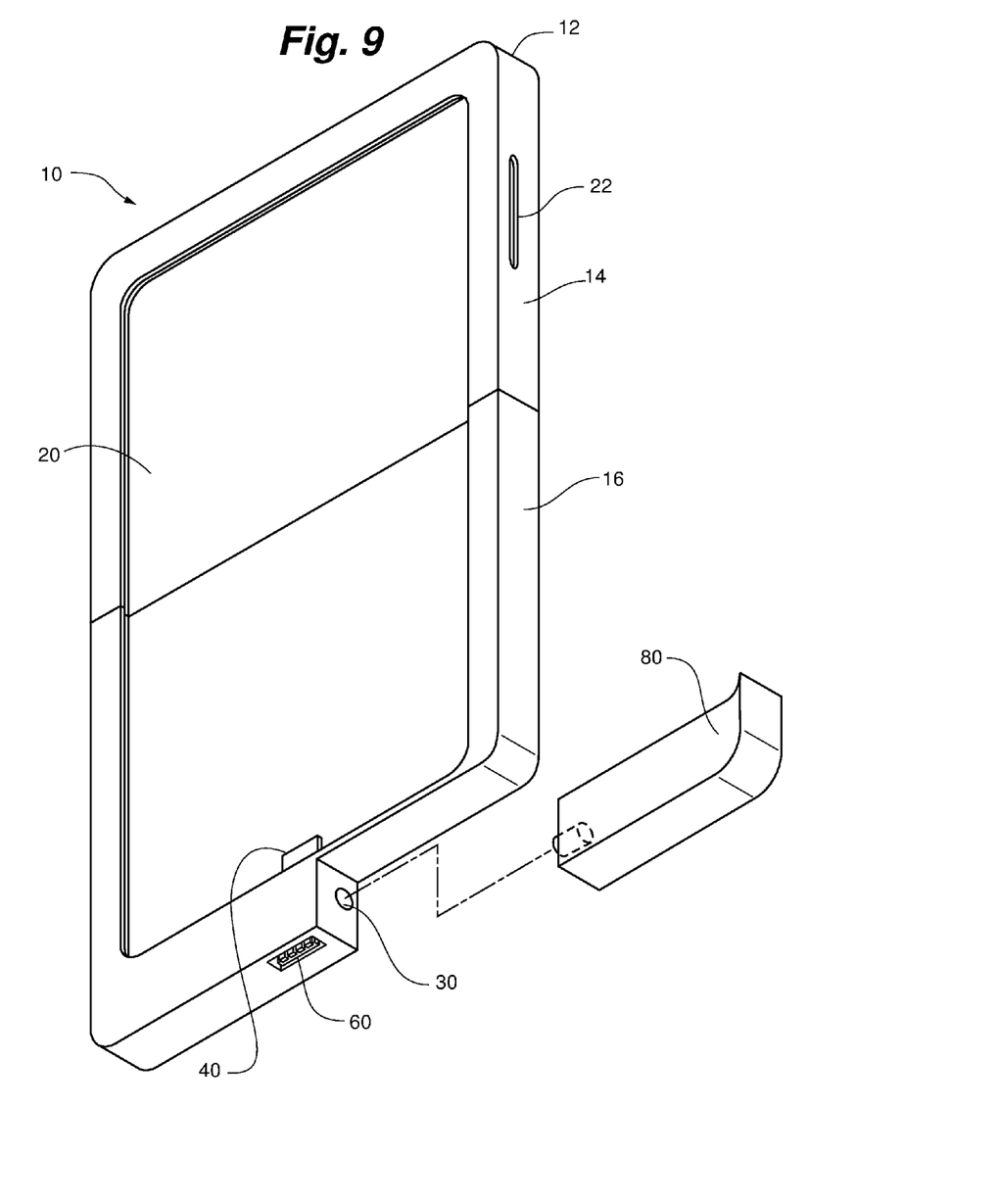
FIG. 9 shows the embodiment of FIGS. 1*b*-7 wherein a cap is shown disengaged from the analog port.

In some embodiments, such as are depicted in FIGS. 2-5 and 9-11, when the port 30 is not in use, a cap 80 may be positioned over the port 30 and/or be engaged thereto. Cap 80 may be of the same composition as the body 12 and/or may be a portion thereof. In the embodiment shown in FIGS. 2-5, it is seen that the cap 80 is configured to provide the case 10 with a uniform shape when the cap 80 is engaged to the body 12 such as in the manner shown. As is shown in FIG. 7-9, the cap 80 may be readily removed from the body 12 so as to provide access to the port 30. In some embodiments the cap 80 may be engaged to the body 12 by mechanical (such as by a friction fit with the port 30 and/or adjacent region of the body 12) or magnetic engagement.

In some embodiments, the case 10 is constructed to provide a secondary region of attachment for the cap 80, whereby the cap 80 can be engaged to the body 12 when removed from its secured position over the port 30 so as to minimize the chance that the cap 80 is lost when not engaged to the body 12 and port 30.

Figure 10:
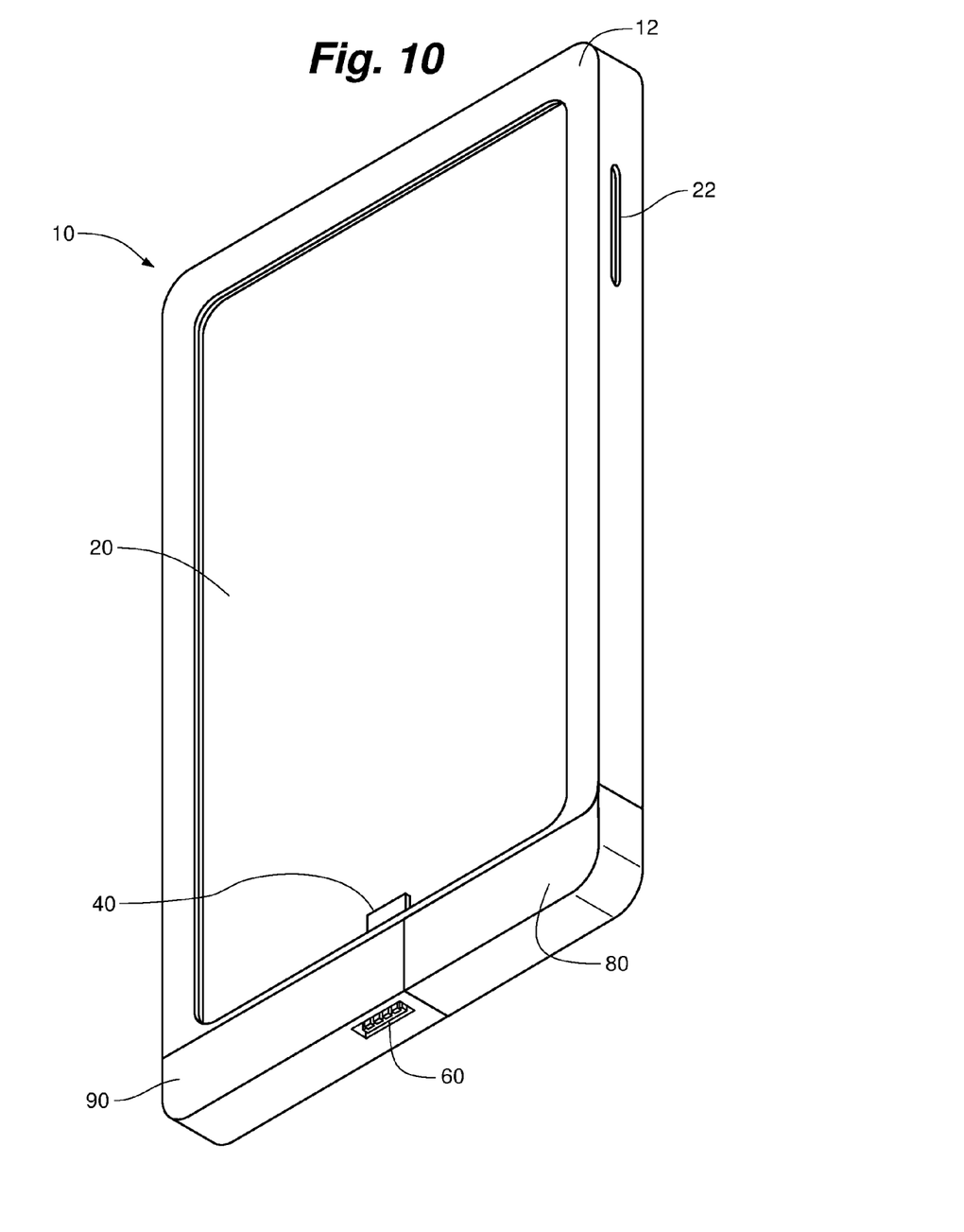
FIG. 10 shows an alternative embodiment of the case wherein all the electronics of the case are contained in an electronics package that is capable of being removeably engaged from the adjacent portions of the body.
Figure 11:
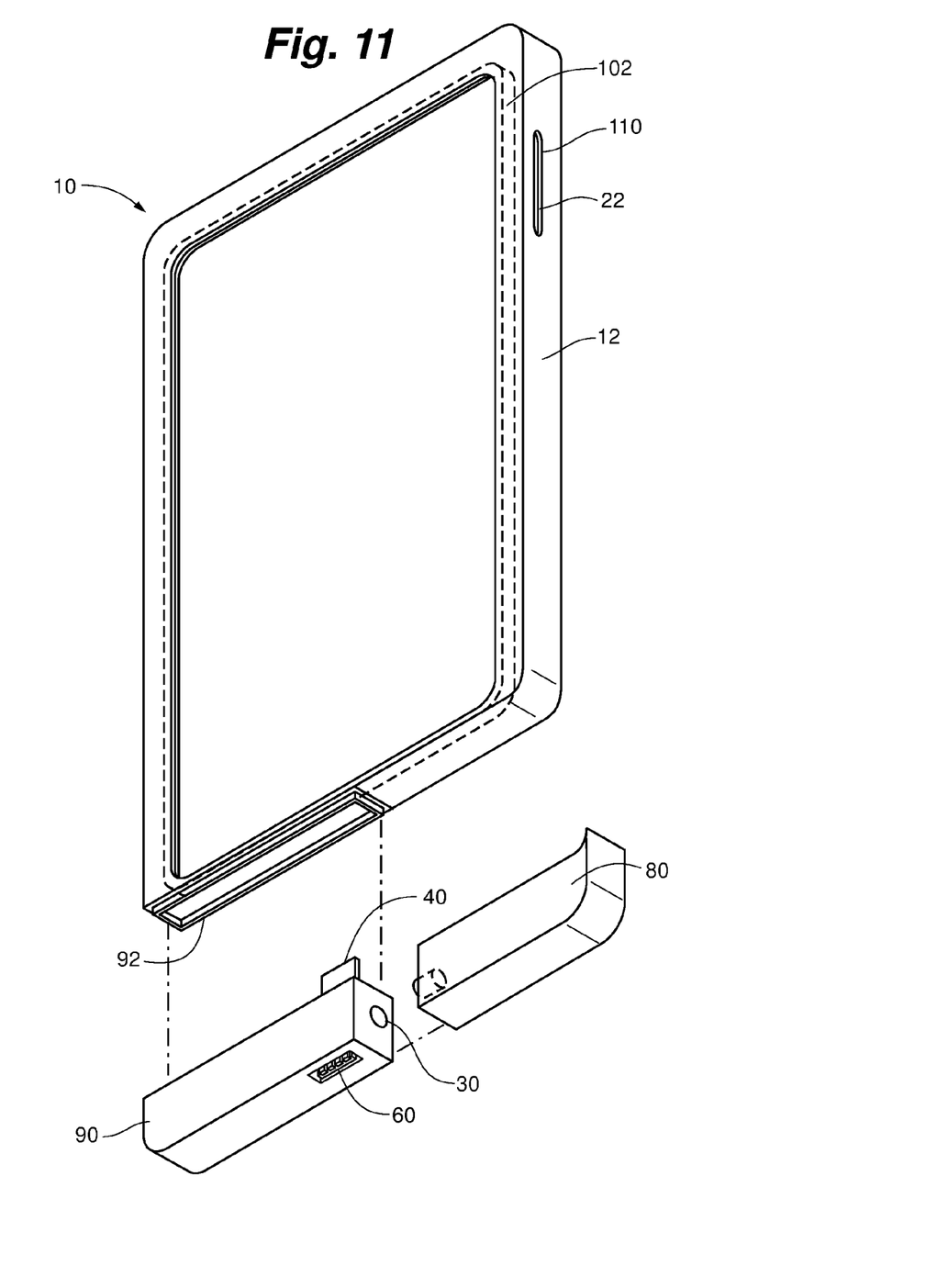
FIG. 11 shows an exploded view of the embodiment depicted in FIG. 10.

Turning now to the embodiment shown in FIGS. 10-11. In this embodiment all of the features previously shown and described are included with the case 10 shown. In this embodiment however, the body 12 includes an electronics package 90 that is self-contained and removeably engaged to the body 12. Electronics package 90 includes all of the elements of the case 10 as are shown in FIG. 6 including the plug 40, analog port 30, female port 60 and all electronic components and pathway 50 extending therebetween.

Electronics package 90 is configured to be engaged to the body 12 and phone 102 by via the mating of the plug 40 to the port 120 (hidden from view here, see FIG. 1b for context) and/or via a mating surface 92 such as in the manner shown in FIG. 11. Mating surface 92 is configured to allow the electronics package 90 to be frictionally engaged, such as by a snap-fit relationship, with the region of the body 12 adjacent to the base of the phone 102. In some embodiments the engagement of the electronics package 90 to the body 12 may be by any known engagement mechanism.

In some embodiments the electronics package 90 is configured for use with any commercially available phone and/or phone case. By plugging plug 40 of the electronic package into the female BUS port of a phone or phone equipped with an existing protective case, such a phone may be provided with the auxiliary analog port 30 for use therewith. Though engagement of the plug 40 to pre-existing phones and/or cases should be sufficient to ensure that the electronics package remains in place during use. In some embodiments, various engagement mechanisms may be incorporated between the package 90 and/or phone to which it is to be used so as to improve and maintain the securement of the electronics package 90 to such pre-existing phones and/or cases. Such mechanisms include magnetic interfaces, temporary adhesives, hook and loop fasteners (e.g. VELCRO®), etc.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A case for use with a phone, the case comprising:
   a body, the body configured to be engaged around the perimeter of a phone;
   an analog port contained within the body, the analog port constructed and arranged to receive a TRS plug of an electronic accessory;
   an electronic plug, the electronic plug constructed and arranged to interface with into an electronic port of the phone;
   an electronic pathway, the electronic pathway providing digital data communication from the phone to the analog port, via the interface of the electronic plug and the electronic port, when the case is engaged to the phone, the case converting the digital data to an analog signal.

2. The case of claim 1, wherein the body has an upper portion and a lower portion, the upper portion and the lower portion being releasably secured to one another, the lower portion housing the analog port, the electronic plug and the electronic pathway.

3. The case of claim 2, wherein the body defines a linking mechanism between the upper portion of the body and the lower portion of the body.

4. The case of claim 1, wherein the body comprises at least one ancillary control surface, the at least one ancillary control surface being positioned at a location on the body corresponding to the position of a control mechanism of the phone when the case is engaged to the phone.

5. The case of claim 1, wherein the electronic plug comprises a computer bus and power transmission connection.

6. The case of claim 5, wherein the electronic plug comprises a male lightning plug.

7. The case of claim 5, wherein the electronic plug comprises a male USB plug.

8. The case of claim 1, wherein the case comprises an electronic port, the electronic port of the case constructed and arranged to be in electronic communication with the electronic port of the phone, via the electronic pathway, when the electronic plug is engaged to the electronic port of the phone.

9. The case of claim 8, wherein the electronic port of the case comprises a computer bus and power transmission connection.

10. The case of claim 9, wherein the electronic port of the case comprises a female lightning port.

11. The case of claim 9, wherein the electronic port of the case comprises a female USB port.

12. The case of claim 1 further comprising a cap, the cap comprising a portion of the body normally adjacent to the analog port, the cap being removeably engaged to the analog port.

13. The case of claim 1 wherein a portion of the body defines an electronics package, the electronics package containing the analog port, the electronic plug and the electronic pathway, the portion of the body defining the electronics package being removeably engaged to an adjacent portion of the body.

14. A phone and case assembly comprising:
   a phone, the phone having a female electronic port for data and power transmission and receipt;
   the case having:
      a body engaged around the perimeter of the phone;
      an analog port contained within the body, the analog port constructed and arranged to receive a TRS plug of an electronic accessory;
      a male electronic plug, the male electronic plug constructed and arranged to interface with the female electronic port of the phone;
      an electronic pathway, the electronic pathway providing digital data communication from the phone to the analog port, through the interface of the male electronic plug of the case and the female electronic port of the phone, the case converting the digital data to an analog signal;
      a female electronic port, the female electronic port of the case in communication with the female electronic port of the phone, via the electronic pathway and the interface of the male electronic plug of the case with the female electronic port of the phone.

15. The assembly of claim 14, wherein the case further comprises a removable cap, the removable cap comprising a portion of the body adjacent to the analog port, the cap being removeably engaged to the analog port.

* * * * *